May 20, 1958 A. BOEKHORST 2,835,797
CIRCUIT-ARRANGEMENT FOR FREQUENCY-TRANSFORMATION OF OSCILLATIONS OF VERY HIGH FREQUENCY
Filed Oct. 25, 1954
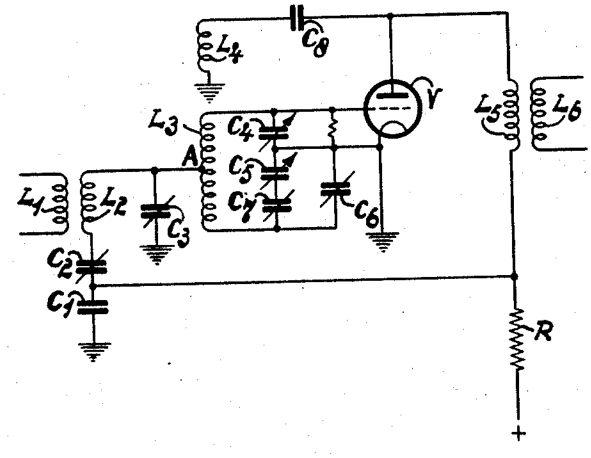
INVENTOR
ANTONIUS BOEKHORST
BY Fred M. Vogel
AGENT

United States Patent Office 2,835,797

Patented May 20, 1958

2,835,797

CIRCUIT-ARRANGEMENT FOR FREQUENCY-TRANSFORMATION OF OSCILLATIONS OF VERY HIGH FREQUENCY

Antonius Boekhorst, Eindhoven, Netherlands, assignor, by mesne assignments, to North American Philips Company, Inc., New York, N. Y., a corporation of Delaware Application October 25, 1954, Serial No. 464,579

Claims priority, application Netherlands November 28, 1953

1 Claim. (Cl. 250—20)

This invention relates to circuit-arrangements for frequency-transformation of oscillations of very high frequencies, for example of the order of $10^8$ C./S., such as are used in television, which comprises a self-oscillating frequency changer, more especially a triode, between the control grid and cathode whereof is connected a circuit which is tuned to the oscillator frequency. In order to mitigate as much as possible the radiation of oscillations of oscillator frequency by the antenna with such circuit arrangements, it is known to feed the incoming oscillation to a point of the oscillator circuit, which does not carry any appreciable voltages of oscillator frequency relative to earth.

For this purpose it is customary to derive the oscillations of intermediate frequency from a circuit included in the anode circuit and, moreover, to provide a generally inductive feed-back between said circuit and the grid circuit in order to maintain the oscillations of oscillator frequency. As a rule the intermediate frequency is of the order of $10^7$ C./S.

The present invention has for its object to make such a circuit arrangement tunable in a simple manner over a comparatively large frequency range, whilst the radiation of the oscillations of oscillator frequency by the antenna circuit remains low for all frequencies even without employing a preceding high-frequency amplification stage. A further object of the invention is to secure a feedback for the intermediate-frequency oscillations in a simple manner.

The invention consists in that the oscillator circuit connected between the grid and the cathode comprises, besides an inductance, two series-connected substantially equal tuning capacitors whereof the capacities are varied in the same sense and the common point is connected to the cathode.

Said capacitors may constitute a structural unit and consist of a single capacitor construction with a split stator whereof the parts have equal capacities. Capacitors of this type are known per se, the common rotor being connected to the cathode of the frequency changer.

By means of said capacitors not only the oscillator circuit but also the input circuit for the incoming high-frequency oscillations are tuned. The latter may partly consist of an inductance which is coupled to the antenna circuit and connected between the tapping point of the inductance of the oscillator circuit, to which the high-frequency oscillations are supplied, and the cathode. The high-frequency input circuit may be regarded as consisting of the last-mentioned inductance in series with the parallel-connected capacitors and parts of the inductance coil of the oscillator circuit.

A feedback of the intermediate-frequency oscillation is obtainable by connecting a point of the output circuit, across which oscillations of intermediate frequency occur, to the common point of two capacitors which, in series with the inductance to which the incoming oscillations are delivered, are connected between the tapping point of the oscillator coil and the cathode of the frequency changer.

By providing a number of semi-variable capacitors in a suitable manner the circuit arrangement can be made free from radiation for a comparatively large frequency range in a simple manner.

In order that the invention may be readily carried into effect, it will now be described with reference to the accompanying drawing, in which an example thereof is shown diagrammatically, it being assumed that the proposed self-oscillating mixer stage is intended for receiving a television band extending from 174 to 216 mc./s.

In the drawing, $L_1$ represents an inductance included in the antenna circuit and from which the incoming oscillations are fed to a coil $L_2$ which may be regarded as the tuning coil for the tunable high-frequency receiving circuit. $L_3$ represents the oscillator tuning coil, and $L_4$ represents the feedback winding which is connected through a capacitor $C_8$ to the anode of the frequency changer tube V. $L_5$ represents the inductance of the first intermediate frequency circuit, which is inductively coupled to the inductance $L_6$ of a second intermediate frequency circuit, which may be connected to the intermediate frequency amplifier. The lower end of the inductance $L_5$ is connected through a resistor R to the positive terminal of a voltage supply. Across said resistor there occurs a certain intermediate frequency voltage which is applied through a conductor to the common point of two capacitors $C_1$ and $C_2$ which are connected between the lower end of coil $L_2$ and earth. The cathode of the frequency changer V is also earthed. The upper end of coil $L_2$ is connected to a tapping point A on coil $L_3$, and the upper end of coil $L_3$ is connected to the control grid of the tube V.

The capacitor $C_8$ may be regarded as being effectively connected for intermediate frequency oscillations in parallel with the coil $L_5$ and constitutes its tuning capacitance, together with the stray capacities.

Across the capacitor $C_1$ there occurs part of the intermediate frequency voltage which is applied to the control grid of the triode V by way of the capacitor $C_2$, coil $L_2$ and the upper part of coil $L_3$, with the result that the damping of the intermediate frequency is reduced. The capacitor $C_2$ is a trimmer capacitor and serves to obtain the desired frequency difference between the resonance frequency of the high-frequency circuit and that of the oscillator circuit. $C_3$ is a parallel trimmer for the high-frequency circuit.

The capacitors $C_4$ and $C_5$ constitute the parts of a capacitor with split stator whereof the rotor is connected to earth. The capacities of said capacitors vary in the same sense. With regard to the oscillator circuit they are connected in series and determine its tuning. With regard to the high-frequency circuit the capacities of the capacitors $C_4$ and $C_5$ in series with the two parts of $L_3$ may be regarded to be connected in parallel, hence they also determine the tuning of the high-frequency circuit.

The capacitor $C_6$ is a push-pull trimmer by means of which the oscillator voltage set up at point A connecting the high frequency coil to the oscillator coil is adjusted to as low a value as possible when the capacities of $C_4$ and $C_5$ are as low as possible. $C_7$ is a push-pull padding capacitor by means of which the oscillator voltage set up at point A is adjusted to the minimum value at the highest capacity of the capacitors $C_4$ and $C_5$. The capacitors $C_6$ and $C_7$ permit the tapping of the oscillator coil to be provided beyond the centre thereof with the result that the oscillator voltage at the tapping point A is adjustable to zero at two points of the tuning range, so that a very low radiation voltage occurs at the antenna throughout the tuning range.

What is claimed is:

A circuit arrangement for frequency transformation of oscillations of very high frequency, comprising an electron discharge device containing a cathode, a control grid and an anode, an oscillatory circuit connected between said cathode and said grid and comprising two variable capacitors connected in series combination and an inductance, said series combination being connected electrically in parallel with said inductance and said variable capacitors having substantially equal values of capacitance and being simultaneously variable in the same sense, an electrical connection between said cathode and the junction of said variable capacitors, a feedback circuit connected between said anode and said grid to cause a local oscillation to occur at the frequency to which said oscillatory circuit is tuned, a second inductance connected at an end thereof to a point on the first-named inductance, two additional capacitors connected in series between said cathode and the remaining end of said second inductance, a source of incoming oscillations coupled to said second inductance, means connected to derive from said anode an intermediate-frequency signal which is produced by said circuit arrangement, and means connected to apply said intermediate-frequency signal to the junction of said two additional capacitors.

References Cited in the file of this patent

UNITED STATES PATENTS

| | | |
|---|---|---|
| 1,560,854 | Pressley | Nov. 10, 1925 |
| 1,740,331 | Carlson | Dec. 17, 1929 |
| 2,061,818 | Meyers | Nov. 24, 1936 |
| 2,582,725 | Strutt | Jan. 15, 1952 |
| 2,616,035 | Adler | Oct. 28, 1952 |
| 2,753,449 | Boggs | July 3, 1956 |

FOREIGN PATENTS

| | | |
|---|---|---|
| 73,671 | Denmark | Jan. 21, 1952 |
| 698,397 | Great Britain | Oct. 14, 1953 |